United States Patent
Persson et al.

(10) Patent No.: US 6,773,799 B1
(45) Date of Patent: Aug. 10, 2004

(54) PROCESS FOR THE MANUFACTURING OF A DECORATIVE LAMINATE, A DECORATIVE LAMINATE OBTAINED BY THE PROCESS AND USE THEREOF

(75) Inventors: Stefan Persson, Malmö (SE); Dennis Rasmusson, Perstorp (SE); Thord Andersson, Perstorp (SE); Börje Sjöstedt, Örkelljunga (SE)

(73) Assignee: Decorative Surfaces Holding AB, Perstorp (SE)

( * ) Notice: Subject to any disclaimer, the term of this patent is extended or adjusted under 35 U.S.C. 154(b) by 0 days.

(21) Appl. No.: 09/423,270

(22) PCT Filed: May 4, 1998

(86) PCT No.: PCT/SE98/00810

§ 371 (c)(1),
(2), (4) Date: Dec. 30, 1999

(87) PCT Pub. No.: WO98/50207

PCT Pub. Date: Nov. 12, 1998

(30) Foreign Application Priority Data

May 6, 1997 (SE) .............................................. 9701691
Oct. 28, 1997 (SE) .............................................. 9703916

(51) Int. Cl.[7] ........................... B32B 5/16; B32B 27/42; B27N 3/02
(52) U.S. Cl. ...................... 428/323; 428/326; 428/524; 428/530; 428/535; 428/537.1; 264/109; 264/112; 156/62.2; 156/244.11; 156/307.4
(58) Field of Search ............................... 428/323, 535, 428/537.1, 326, 524, 530; 264/129, 109, 112; 156/307.4, 244.11, 62.2

(56) References Cited

U.S. PATENT DOCUMENTS 3,492,388 A * 1/1970 Inglin-Knusel ............. 264/129
3,769,143 A * 10/1973 Kulesza ...................... 428/151
4,044,185 A * 8/1977 McCaskey, Jr. et al. .... 428/153
4,379,193 A * 4/1983 Hunt .......................... 428/196
4,789,604 A * 12/1988 van der Hoeven .......... 428/503
5,405,705 A * 4/1995 Fujimoto et al. ......... 428/537.1
5,611,882 A * 3/1997 Riebel et al. ............... 428/532

FOREIGN PATENT DOCUMENTS

| EP | 0122905 | 10/1984 |
|----|---------|---------|
| EP | 0329154 | 8/1989  |
| FR | 1507841 | 11/1967 |
| FR | 2609927 | 7/1988  |
| GB | 2265150 | 9/1993  |
| SE | 506696  | 2/1998  |
| WO | 9400280 | 1/1994  |
| WO | 9604114 | 2/1996  |

* cited by examiner

Primary Examiner—Monique R. Jackson
(74) Attorney, Agent, or Firm—Stevens, Davis, Miller & Mosher, L.L.P.

(57) ABSTRACT

A process for manufacturing a decorative mainly isometric thermosetting laminate (1) comprising an isometric core (2), a primary surface layer (10) and optionally a secondary surface layer (20). 85 parts by weight of preferably organic particles are mixed with 15–85 parts by weight of a thermosetting resin such as phenol-formaldehyde resin, melamine-formaldehyde resin, urea-formaldehyde resin or mixtures thereof under powerful kneading in an extruder sot hat friction heat forms. The thermosetting resin is hereby bonded to or impregnating the particles. The particles possibly bonded to one another are parted whereby an agglomerate of resin and particles is formed. The particle/resin mixture is then dried to a water content of below 10%. The dried particle/resin mixture is then evenly distributed and continuously or discontinuously compressed in one or more steps under heat and pressure so that the resin finally cures, whereby an isometric core (2) is formed. The core (2) is during or after the pressing provided with a primary (10) and optionally a secondary (20) surface layer. The invention also relates to a laminate obtained through the process and use thereof.

66 Claims, 8 Drawing Sheets

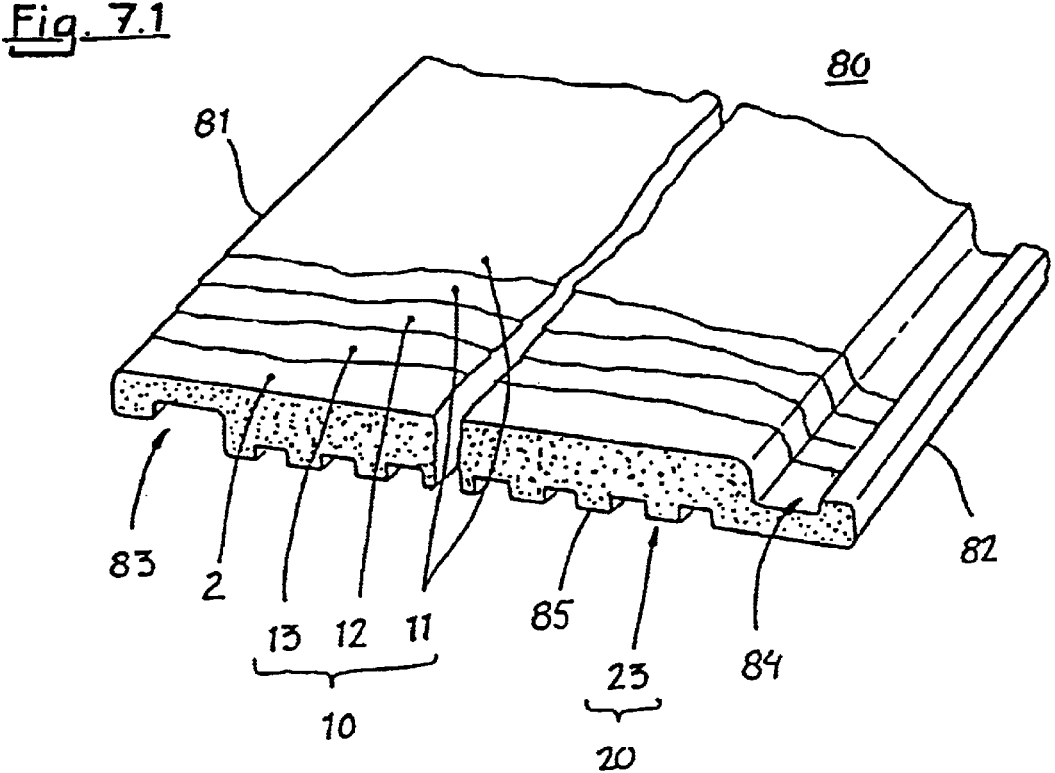
Fig. 7.1
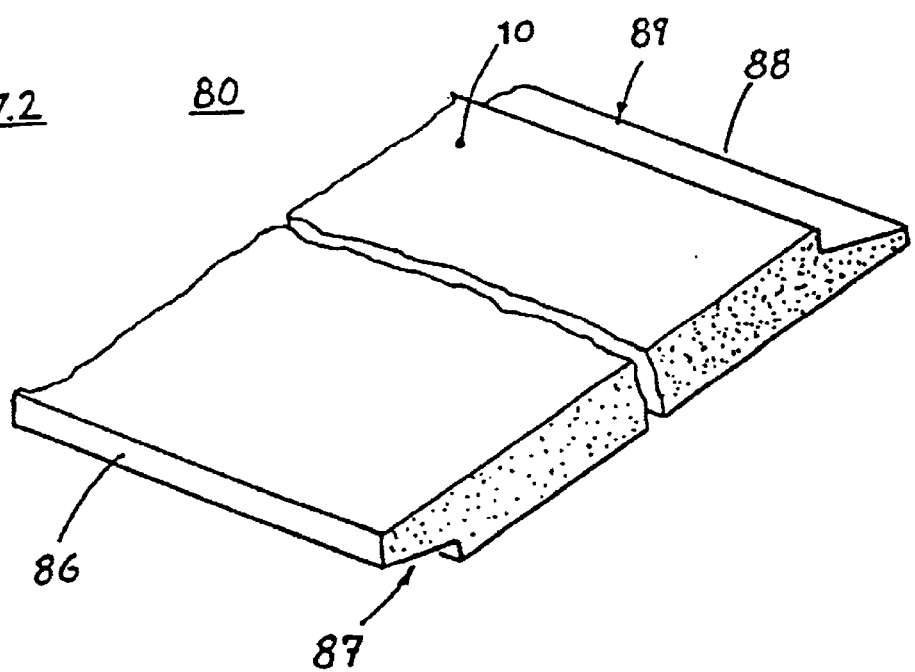
Fig. 7.2

PROCESS FOR THE MANUFACTURING OF A DECORATIVE LAMINATE, A DECORATIVE LAMINATE OBTAINED BY THE PROCESS AND USE THEREOF

The present invention relates to a process for manufacturing a decorative mainly isometric thermosetting laminate, a decorative thermosetting laminate obtained by the process, and use thereof.

Products clad with thermosetting laminates are quite common nowadays. They are most often used where the demand for abrasion resistance is great but also where resistance towards different chemical substances and moisture is required. Floors, floor skirtings, work tops, table tops, doors and wall panels can serve as an examples of such products. The thermosetting laminate is most often made from a number of base sheets and a decorative sheet placed closest to the surface. The decorative sheet may be provided with the desired decor or pattern. Thicker laminates are often provided with a core of particle board or fibre board where both sides are covered with sheets of thermosetting laminate. The outermost sheet is, on at least one side, most often a decorative sheet.

One problem with such thicker laminates is that the core is much softer than the surface layer which is made from paper impregnated with thermosetting resin. This will cause a considerably reduced resistance towards thrusts and blows compared to a laminate with a corresponding thickness made of paper impregnated with thermosetting resin only.

Another problem with thicker laminates with a core of particle board or fibre board is that these normally will absorb a large amount of moisture, which will cause them to expand and soften whereby the laminate will warp. The surface layer might even, partly or completely come off in extreme cases since the core will expand more than the surface layer. This type of laminate can therefore not be used in damp areas, such as wet rooms, without problem.

The problems can be partly solved by making the core of paper impregnated with thermosetting resin as well. Such a laminate is most often called compact laminate. These compact laminates are, however, very expensive and laborious to obtain as several tens of layers of paper have to be impregnated, dried and put in layers. The direction of the fibre in the paper does furthermore cause a moisture and temperature difference relating expansion. This expansion is two to three times as high in the direction crossing the fibre than along the fibre. The longitudinal direction of the fibre is coinciding with the longitudinal direction of the paper. One will furthermore be restricted to use cellulose as a base in the manufacturing though other materials could prove suitable.

The above problems have through the present invention been solved whereby a flexible process for the manufacturing of a mainly isometric thermosetting laminate has been achieved where the process easily can be adapted regarding cost efficiency, impact resistance, rigidity, density, moisture absorption, expansion, mould resistance and fire resistance. The invention relates to a process for the manufacturing of a decorative mainly isometric thermosetting laminate comprising an isometric core, a primary surface layer and optionally a secondary surface layer. The invention is characterised in that 85 parts by weight of preferably organic particles, which particles have an average particle size in the range of 5–3000 μm, preferably 5–2000 μm, are mixed with 15–85 parts by weight, preferably 22–37 parts by weight, of a thermosetting resin in the form of a powder which resin is selected from the group of phenol-formaldehyde resins, melamine-formaldehyde resins, urea-formaldehyde resins or mixtures thereof. The mixing takes place in for example an extruder where the mixture is kneaded powerfully so that friction heat is formed. It is also possible to use a calendar mill for the same purpose. The friction heat is not allowed to exceed 150° C., preferably below 110° C., most preferably below 90° C. The thermosetting resin is thereby bonding to or impregnating the particles by becoming soft. The particles that possibly are joined by the thermosetting resin are divided and an agglomerate of thermoplastic resin and particles is formed. The agglomerate has an average particle size of 200–3000 μm and a resin content of 10–50% by weight, preferably 20–30% by weight.

The particle/resin mixture is thereafter dried to a water content below 10% by weight, preferably below 5% by weight.

The dried particle/resin mixture is thereafter evenly distributed on a carrier, a pressing belt of a continuous laminate press or on a press plate of a discontinuous laminate press. The dried particle/resin mixture is thereafter continuously or discontinuously compressed at a temperature of 60–120° C., preferably 80–100° C. and a pressure of 15–400 bar, preferably 30–120 bar so that the particle/resin agglomerate flow out without completely curing the resin. A pre-fabricate to an isometric core is hereby obtained. The core pre-fabricate is then fed between the press belts of a continuous laminate press, or is placed on a press plate of a discontinuous laminate press, together with a primary surface layer which is provided with a decorative layer, and optionally a secondary layer and is thereafter continuously or discontinuously compressed at a temperature of 120–200° C., preferably 140–180° C. and a pressure of 15–300 bar, preferably 30–150 bar so that the resin cures, whereby a decorative thermosetting laminate provided with an isometric core is obtained.

According to another alternative the above achieved dried particle resin/mixture is evenly distributed on a carrier, a press belt of a continuous laminate press or on a discontinuously compressed at a temperature of 120–200° C., preferably 140–180° C. and a pressure of 15–300 bar, preferably 30–150 bar so that the resin cures, whereby an isometric core is formed. The core is provided with a primary surface layer and optionally a secondary surface layer in connection to or after the pressing.

A pressure in the range 15–70 bar is usually used in a continuous pressing process while a pressure in the range of 50–400 bar is used in discontinuous pressing.

The particles are suitably completely or partly constituting of wood parts or fruit parts from plants, whereby the wood parts for example include saw dust, wood powder or finely chopped straw while the fruit parts suitably consists of some kind of cereal in the form of flour, for example corn wheat or rice flour. The particles may also completely or partly consist of recycled material such as waste paper, cardboard or rejects from thermosetting laminate manufacturing. The particles may furthermore be completely or partly made of lime. The particles are thereby selected by the characteristics they will give the finished laminate. Mixtures of different particles will also give favourable characteristics. The particles are suitably dried to a water content of below 10% by weight, preferably below 6% by weight, before the mixing.

The dried particle/resin mixture is preferably distributed so that the difference in particle weight per area unit of the surface of the intended core doesn't exceed 10%, preferably below 3%. The particle/resin mixture is for example distributed on a press plate to a discontinuous multiple opening press. The press plate can be provided with a detachable frame which surrounds the prospective core. The frame might alternatively be attached to the press plate whereby the frame and the plate forms a tray. A second press plate with dimensions smaller than the inner dimensions of the frame is placed on top of the distributed particle/resin mixture in the alternatives where a frame is used. A number of press plates provided with frames and containing particle/resin mixture with a second press plate on top are placed on top of each other and are moved to the laminate press. The second press plate is cancelled in cases where a press plate without frame is used. The procedure otherwise corresponds to the above described procedure with a frame.

The dried particle/resin mixture can also be pressed in a continuous laminating procedure. The particle/resin mixture is then distributed on, for example, a carrier in the form of a web which is continuously feed between two steel belts in a continuous laminate press. The carrier is removed after the passage through the laminate press. The carrier may also be constituted by the primary or the secondary layer whereby the carrier not is separated from the laminate since it forms a part thereof.

The pressing process is suitably initiated with a low initial pressure, preferably 10–50% of the final pressure during which initial pressure the particle/resin mixture is allowed to flow as the resin softens due to the temperature. The pressure is gradually increased before curing starts, which depending on setting agent composition, pressure and temperature takes around 5–120 seconds. The temperature is suitably 100–200° C., preferably 140–170° C. while the pressure is 10–500 bar, preferably 10–300 bar with a final pressure of 100–300 bar during a discontinuous pressing procedure. The temperature is suitably 120–200° C., preferably 140–180° while the pressure 10–300 bar, preferably 10–150 bar with a final pressure of 50–150 bar during a continuous pressing procedure. The initial pressure, the final pressure and the temperatures are in both cases depending on particle size, particle composition and resin composition.

The primary surface layer is preferably made from at least one or more decorative papers, for example α-celluloce impregnated with thermosetting resin, preferably melamine-formaldehyde resin and/or urea-formaldehyde resin. One or more so-called overlay paper sheets, impregnated with melamine-formaldehyde resin or urea-formaldehyde resin are optionally placed on top of the decorative paper. One base paper, impregnated with thermosetting resin preferably melamine-formaldehyde resin, urea-formaldehyde resin, phenol-formaldehyde resin or mixtures thereof is optionally placed under the decorative paper. A diffusion preventing foil is optionally placed under the decorative paper, closest to the core.

It is in certain cases desirable to place a secondary surface layer on the opposite side of the core. The secondary surface layer then suitably consists one or more conventional so-called base papers impregnated with thermosetting resin, preferably phenol-formaldehyde resin or urea-formaldehyde resin. The base paper is intended to counteract warping of the laminate which otherwise could be caused by differences in moisture and temperature related expansion between the core and the surface layer. The secondary surface layer can alternatively consist one or more decorative papers, for example of α-cellulose, impregnated with thermosetting resin, preferably melamine-formaldehyde resin or urea-formaldehyde resin. According to yet another embodiment the secondary surface layer consist of a diffusion preventing foil placed closest to the core.

BRIEF DESCRIPTION OF THE DRAWINGS

The diffusion preventing foil is preferably made of a metal such as aluminium, steel, copper, zinc or of a plastic material such as polyethylene, polypropylene polyalkylene-terephthalate, acrylic polymers, polyvinyl chloride, fluorinated thermoplastic materials or the like. The surfaces of the diffusion preventing foil are suitably treated by being coated with a primer, micro-etched, blasted, corona treated, spark milled, brush-plated, electro-plated or the like so that the adhesion to the impregnated papers and carrier layer respectively is increased by surface enlargement or surface activation. The foil suitably have a thickness of 5–2000 $\mu$m, preferably 10–1000 $\mu$m. Foils of metal suitably have a thickness of 5–200 $\mu$m, preferably 10–100 $\mu$m while foils of thermoplastic material have a thickness of 0.2–2mm, preferably 0.3–1 mm. The thermal coefficient of expansion of the foil is suitably in the range $15 \times 10^{-6}/°$ K and $100 \times 10^{-6}/°$ K, preferably between $15 \times 10^{-6}/°$ K and $50 \times 10^{-6}/°$ K. It is desirable to use a foil with a thermal coefficient of expansion as close as possible to the thermal coefficient of expansion of the thermosetting resin impregnated paper since large differences will cause inner tensions on temperature changes, which might cause de-lamination between the foil or the foils and the other layers. These inconveniences are especially notable at lamination and when cooling the laminate after lamination. It might, however, be desirable in certain applications to select a foil with a temperature depending expansion deviating substantially from the other materials of the laminate. One such application might for example be a non-symmetric laminate where the foil would counteract the temperature depending warping which otherwise would occur in the non-symmetrical laminate. The thermal coefficient of expansion for the usual types of phenol-formaldehyde based laminates lies in the range $15 \times 10^{-6}/°$ K–$40 \times 10^{-6}/°$ K. This value can be effected by, among other, changes in resin content, paper quality and fibre direction but also time, pressure and temperature during pressing. By selecting foils with a suitable thickness and thermal coefficient of expansion, the differences in expansion between the various materials included in the laminate can be adapted whereby the temperature-depending warping can be completely avoided, even in non-symmetrical laminates.

The thermosetting laminate may suitably, at discontinuous pressing, be provided with three-dimensional structures such as, for example, groove, tenon and/or lath-work. It becomes possible to partly, or completely, avoid subsequent treatment by providing the laminate with functional parts during the pressing. The laminate may also be provided with a reinforcing lath-work on the rear side. It has until now not been possible to achieve such functional parts using conventional processes. A foil must be of a limb and ductile kind if a diffusion preventing foil is to be applied to such a rear side. As examples of such foils can be mentioned ductile aluminium foil, annealed copper foil or a thermoplastic foil.

The invention also relates to a thermosetting laminate obtained by the process. The thermosetting laminate is mainly isometric with a difference in coefficient of expansion, between the length and cross direction of the laminate, of below 10%. The thermosetting laminate has suitably an ability to absorb water which is lower than 10% by weight, preferably lower than 6% by weight, after 100 h in water at 23° C.

The thermosetting laminate has furthermore an impact resistance greater of than 2 kJ/m$^2$, preferably greater than 3 kJ/m$^2$. At least one thermosetting resin impregnated paper, preferably the uppermost, is coated with hard particles of, for example, silicon oxide, aluminium oxide and/or silicon carbide with an average size of 1–100 $\mu$m, preferably 5–60 $\mu$m in cases where a thermosetting laminate with a high abrasion resistance is desired.

The invention also relates to the use of a thermosetting laminate obtained by the process. The thermosetting laminate may hereby be used as a lining on floors, inner walls, ceilings, and doors in dry as well as wet rooms. The thermosetting laminate may also be used as table tops, work tops, facade boarding and roofs.

Figure 1:
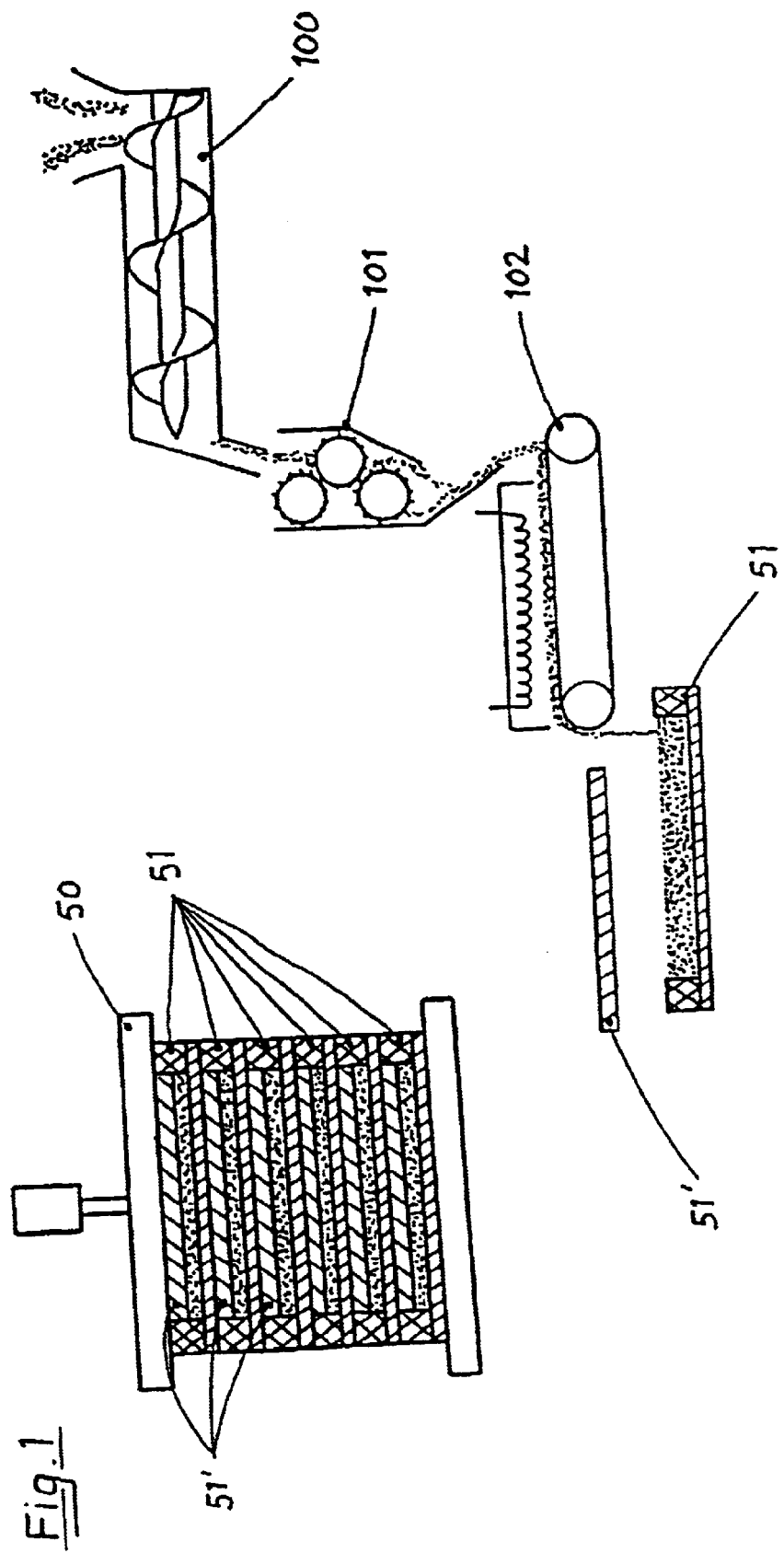

The invention is described further in connection with enclosed drawings and embodiment examples whereby, FIG. 1 shows, schematically, a discontinuous process according to the invention.

Figure 2:
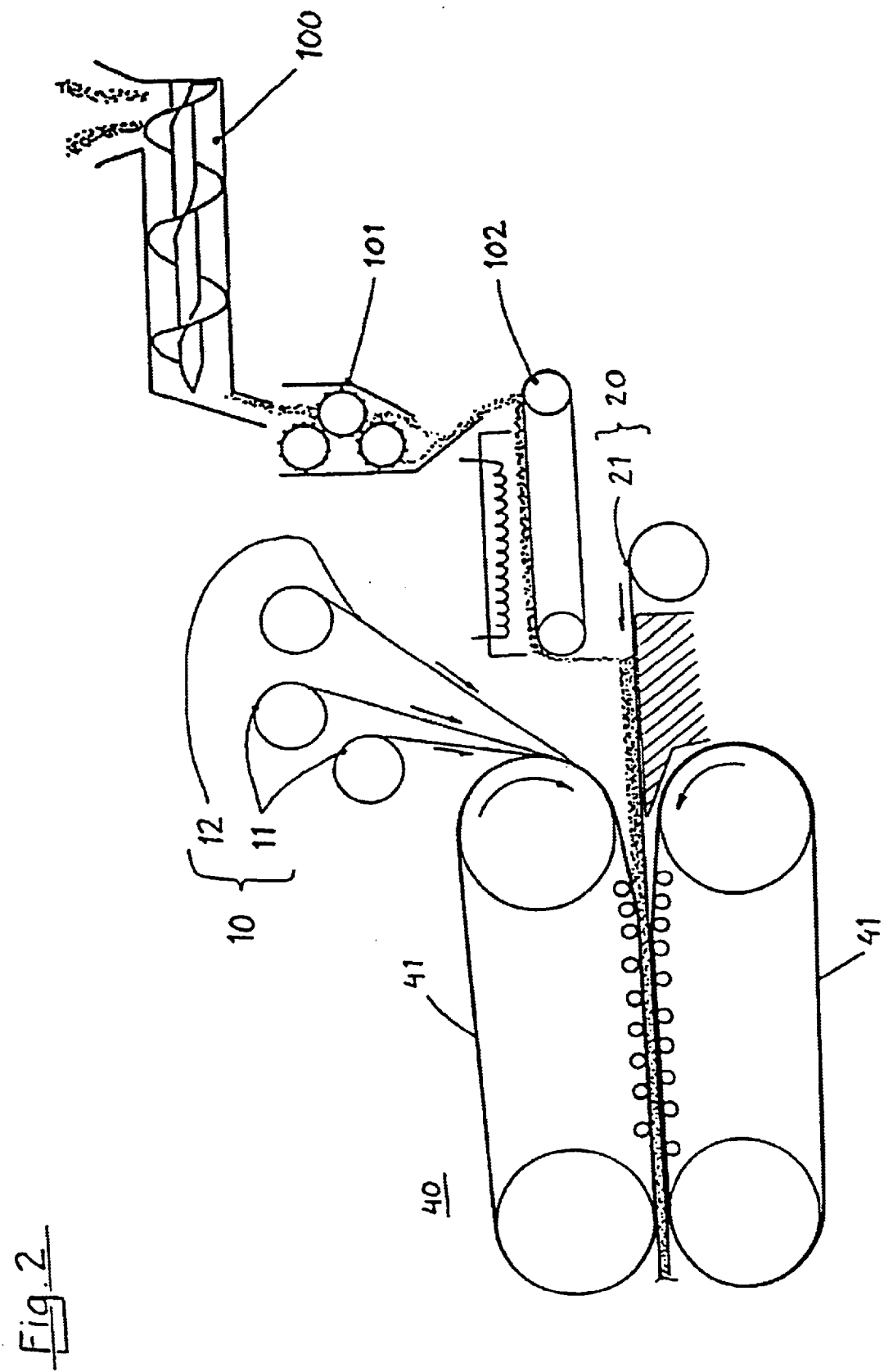

FIG. 2 shows, schematically, a continuous process according to the invention.

Figure 3:
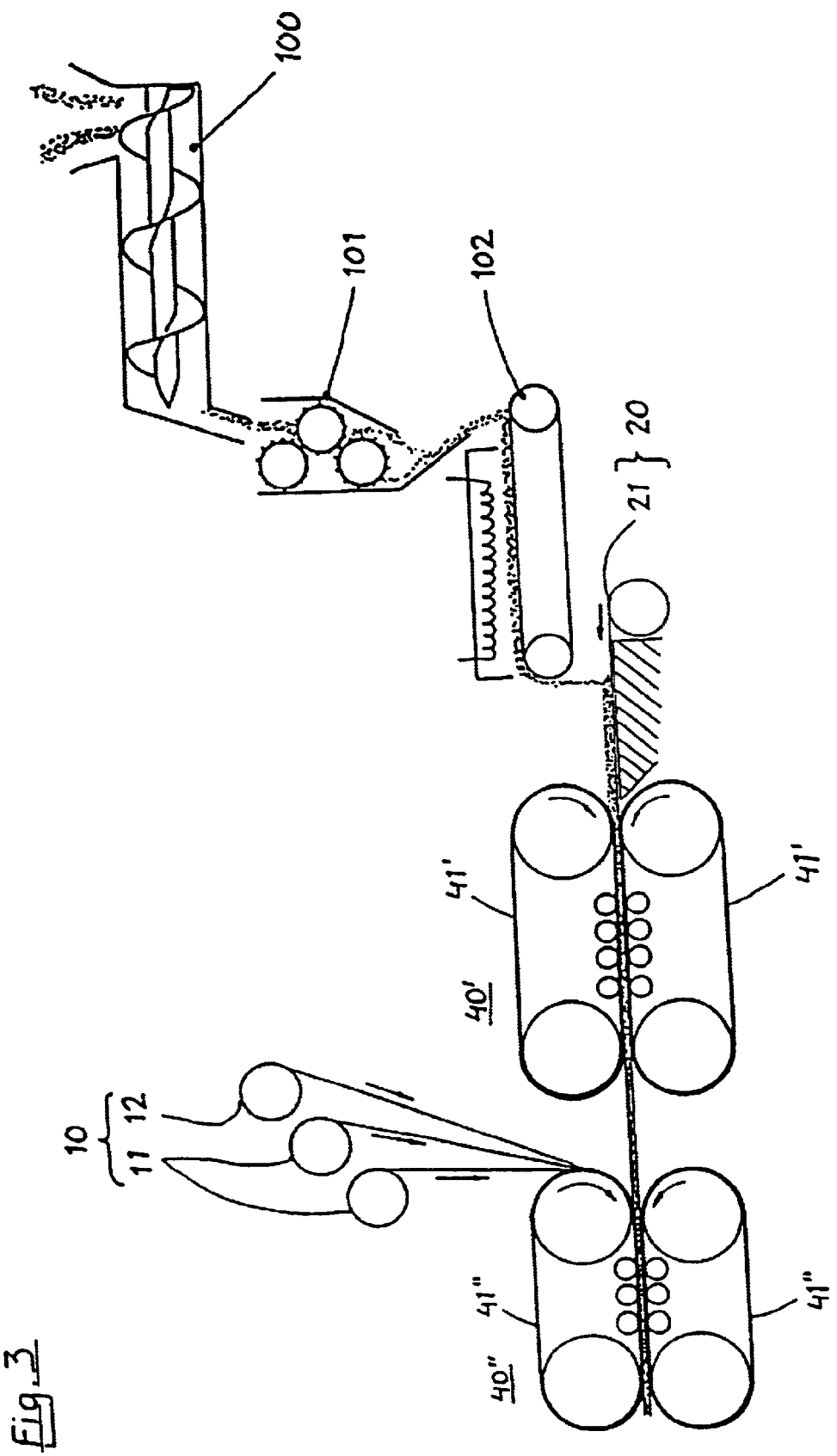

FIG. 3 shows, schematically, an alternative continuous process according to the invention.

Figure 4:
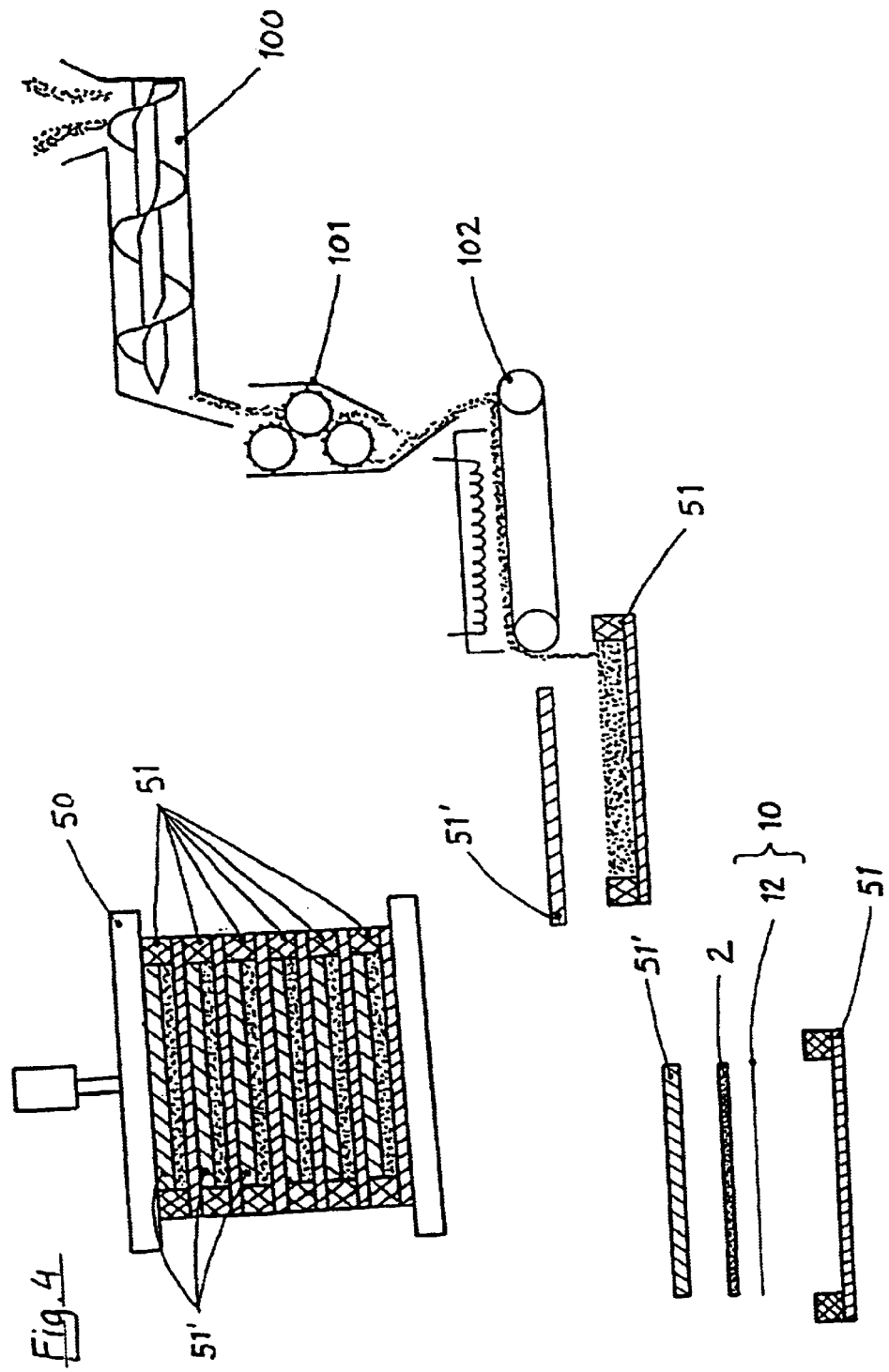

FIG. 4 shows schematically, an alternative discontinuous process according to the invention.

Figure 5:
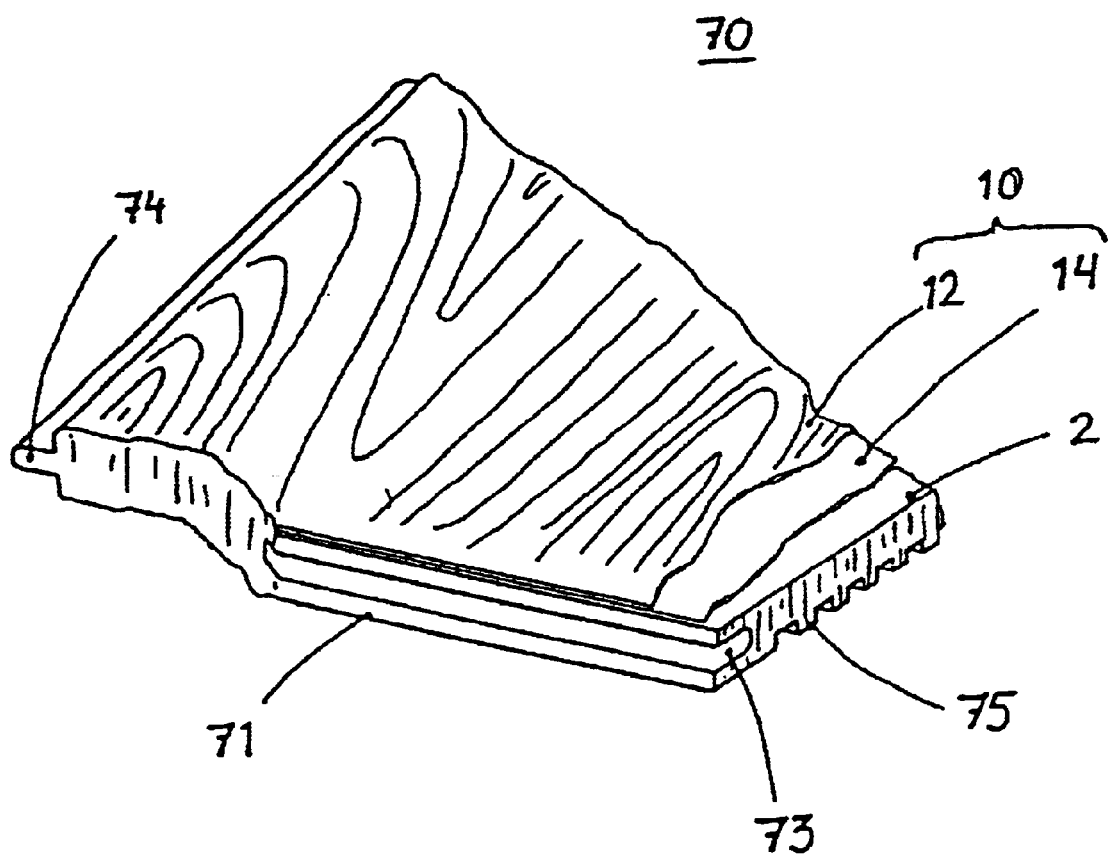

FIG. 5 shows parts of a wall panel obtained by the process.

Figure 6:
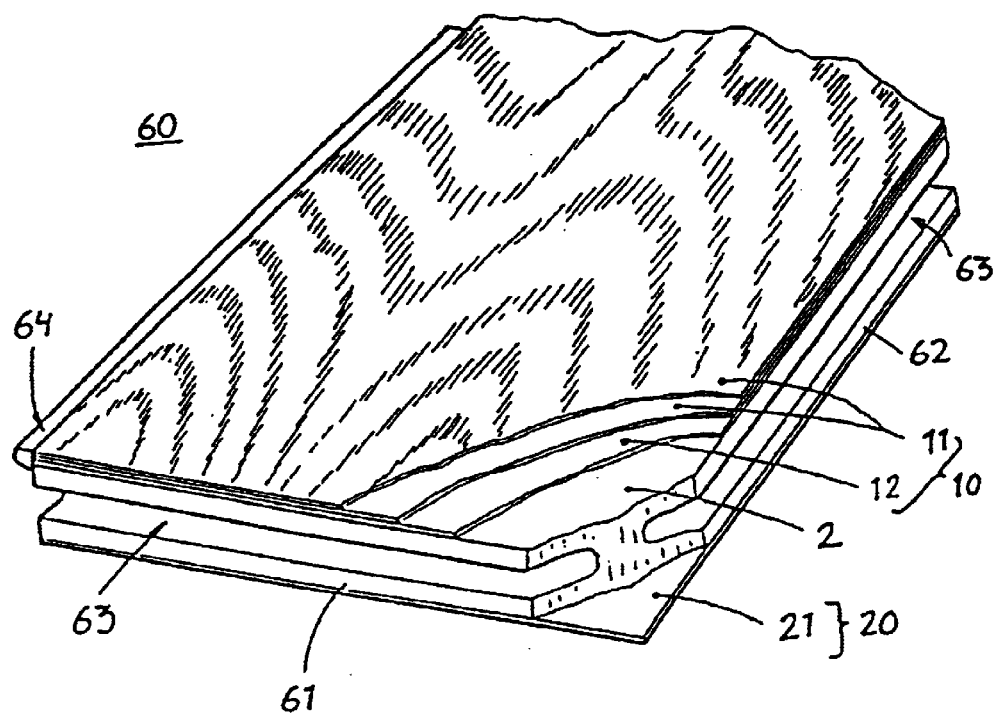

FIG. 6 shows parts of a laminate floor board obtained by the process.

FIGS. 7.1–7.2 show parts of a facade boarding obtained by the process.

Figure 8:
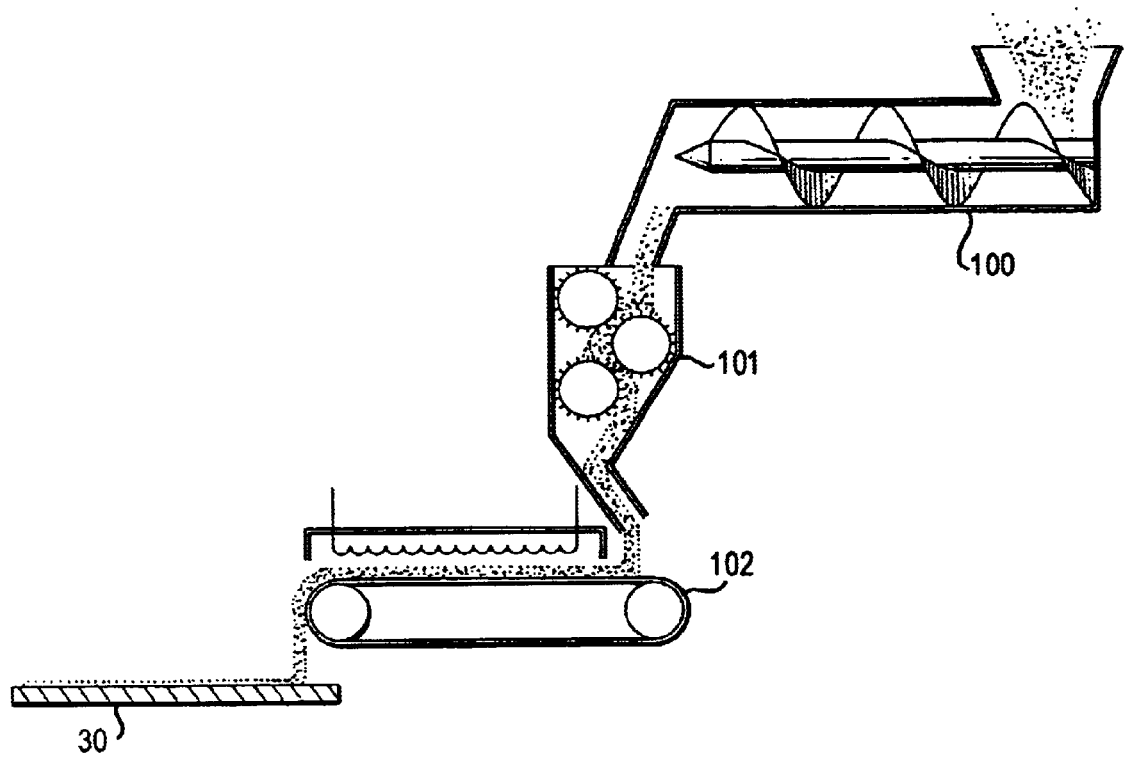

FIG. 8 shows the presence of carrier 30 upon which the dried particle/resin mix is distributed.

Example 1 describes the manufacturing of a wall panel laminate.

Example 2 describes the manufacturing of a floor laminate.

Example 3 describes the manufacturing of a facade boarding laminate.

Example 4 describes an alternative method of manufacturing a wall panel laminate.

Example 5 describes an alternative method of manufacturing a wall panel laminate.

FIG. 1 shows, schematically, a discontinuous process according to the invention wherein a decorative, mainly isometric thermosetting laminate comprising an isometric core, a primary surface layer and possibly a secondary surface layer is manufactured. Particles are dry mixed with a thermosetting resin powder under powerful kneading in an extruder 100 so that friction heat forms. The extruder 100 is provided with cooling. The thermosetting resin will soften due to the heat whereby it will bond to, and impregnate the particles. The particles which possibly are bonded to one another will be parted in a mill 101 whereby an agglomerate of resin and particles is formed. The particle/resin mixture is then dried in a dryer 102, The dried particle/resin mixture is then evenly distributed on a press plate 51 of a discontinuous laminate press 50. The press plate 51 is provided with a frame. A second press plate 51' with outer dimensions smaller than the inner dimensions of the frame is then placed on top a the particle/resin mixture. A number of such press plates 51 are then placed in a laminate press 50 in the form of a multiple opening press where the particle/resin mixture is compressed under heat and pressure so that the resin cures, whereby an isometric core 2 is formed. The surface of the core 2 is treated and provided with a primary surface layer 10 (FIG. 6) in the form of a decorative paper 12 (FIG. 6) after being removed from the press and being allowed to cool. The decorative paper 12 normally consist of α-cellulose, impregnated with melamine-formaldehyde resin which then is dried whereby the solvent is evaporated and the resin is partly cured to a so-called B-stage. Such a paper is normally called pre-preg. This pre-preg is attached to the core through pressing in a laminate press. A secondary surface layer may be attached to the core in the same way. This is of course placed on the other side of the core.

One or more such pre-pregs, which will form the primary surface layer, can according to an alternative embodiment be placed in direct contact with the press plate whereby the particle/resin mixture is distributed on top of the primary surface layer. One lamination process is hereby saved. A secondary surface layer can be integrated with the core in the same way. The secondary surface layer is then placed on top of the distributed particle/resin mixture.

FIG. 2 shows, schematically, a continuous process according to the invention where a decorative, mainly isometric, thermosetting laminate comprising an isometric core, a primary surface layer and a secondary surface layer is manufactured. Particles are dry mixed with a thermosetting resin powder under powerful kneading in an extruder 100 so that friction heat forms. The extruder 100 is provided with cooling. The thermosetting resin will soften due to the heat whereby it will bond to and impregnate the particles. The particles which possibly are bonded to one another will be parted in a mill 101 whereby an agglomerate of resin and particles is formed. The particle/resin mixture is then dried in a dryer 102. The dried particle/resin mixture is then evenly distributed on a carrier 30 which consist of a base paper 21 in the form of a web. The base paper 21 forms the secondary surface layer 20. The base paper web 21 normally consists of Kraft paper which is impregnated with phenol-formaldehyde resin which then is dried. The base paper web 21 with the particle/resin mixture on top is then fed between two steel belts 41 of a continuous laminate press 40 together with an uppermost primary surface layer 10. The primary surface layer 10 consists, from the top, of two so-called overlay papers 11 in the form of webs which were impregnated with melamine-formaldehyde resin which then is dried. A decorative paper 12 in the form a web feed is fed under the overlay paper webs 11, that is closest to the particle/resin mixture. The decorative paper web 12 usually consists of α-cellulose impregnated with melamine-formaldehyde resin which then is dried. The particle/resin mixture and the paper webs are compressed under heat and pressure so that the resin cures, whereby a thermosetting laminate with an isometric core and a decorative and abrasion resistant surface layer 10 and a non-decorative secondary surface layer 20 is formed. The particle/resin mixture will during the pressing be compressed to around a third of its original thickness.

One or both of the overlay webs 11 can be sprinkled with hard particles of for example silicon carbide or aluminium oxide in cases where additional abrasion resistance is desired.

FIG. 3 shows, schematically, a continuous process according to the invention where a decorative, mainly isometric, thermosetting laminate comprising an isometric core, a primary surface layer and a secondary surface layer is manufactured. Particles are dry mixed with a thermosetting resin powder under powerful kneading in an extruder 100 so that friction heat forms. The extruder 100 is provided with cooling. The thermosetting resin will soften due to the heat whereby it bonds to, and impregnates the particles. The particles which possibly are bonded to one another will be parted in a mill 101 whereby an agglomerate of resin and particles is formed. The particle/resin mixture is then dried in a dryer 102, The dried particle/resin mixture is then evenly distributed on a carrier 30 which consists of a base paper 21 in the form of a web. The base paper 21 forms the secondary surface layer 20. The base paper web 21 normally consists of Kraft paper which is impregnated with phenol-formaldehyde resin which then is dried. The base paper web 21 with the particle/resin mixture on top is then fed between two steel belts 41' of a continuous laminate press 40' where they are pressed together under heat and pressure without curing the resin. A core 2 pre-fabricate with a secondary surface layer 20 attached is thereby received. The particle/resin mixture will during the pressing be compressed to about a third of its original thickness. The core 2 pre-fabricate with the attached secondary surface layer 20 is, subsequent passing the first laminate press 40', fed between two steel belts 41" of a second continuous laminate press 40" together with a primary surface layer 10 placed on top. The primary surface layer 10 consists, from the top, of two so-called overlay papers 11 in the form of webs. The overlay paper webs 11, which are made of α-cellulose, were impregnated with melamine-formaldehyde resin which then is dried. A decorative paper 12 in the form a web feed is fed under the overlay paper webs 11, that is closest to the particle/resin mixture. The decorative paper web 12 usually consists of α-cellulose impregnated with melamine-formaldehyde resin which then is dried. The core 2 and the paper webs are pressed together under heat and pressure so that the resin cures, whereby a thermosetting laminate with an isometric core 2, a decorative and abrasion resistant primary surface layer 10 and a non-decorative secondary surface layer 20 is formed.

The core 2 pre-fabricate can alternatively be cut into sheets after the first pressing where the resin only spreads. These sheet shaped cores 2 can then be placed on press plates 51 of a discontinuous laminate press 50 together with paper sheets which will form the surface layer 10. The sheets are then pressed together under heat and pressure so that the resin cures. The second laminate press 40" is hereby excluded.

One or both of the overlay webs 11 can be sprinkled with hard particles of for example silicon carbide or aluminium oxide in cases where additional abrasion resistance is desired.

FIG. 4 shows, schematically, an alternative discontinuous process according to the invention wherein a decorative, mainly isometric, thermosetting laminate comprising an isometric core, a primary surface layer and optionally a secondary surface layer is manufactured. Particles are dry mixed with a thermosetting resin powder under powerful kneading in an extruder 100 so that friction heat forms. The extruder 100 is provided with cooling. The thermosetting resin will soften due to the heat whereby it bonds to, and impregnates the particles. The particles which possibly are bonded to one another will be parted in a mill 101 whereby an agglomerate of resin and particles is formed. The particle/resin mixture is then dried in a dryer 102. The dried particle/resin mixture is then evenly distributed on a press plate 51 of a discontinuous laminate press 50. The press plate 51 is provided with a frame. A second press plate 51' with outer dimensions smaller than the inner dimensions of the frame is then placed on top a the particle/resin mixture. A number of such press plates 51 are then placed in a laminate press 50 in the form of a multiple opening press wherein the particle/resin mixture is compressed under heat and pressure so that the resin cures, whereby a prefabricate to an isometric core 2 is formed. The isometric core 2 prefabricate is, after having removed it from the press and preferably allowing it to cool, again placed on press plate 51 together with a primary surface layer 10 in the form of a decorative paper 12. The decorative paper 12 is normally made of α-cellulose impregnated with melamine-formaldehyde resin which then is dried whereby the solvent evaporates and the resin cures partly to a so called B-stage. Such an impregnated paper is normally called pre-preg. This pre-preg is pressed together with the core 2 in a laminate press under heat and pressure so that the resin cures. A secondary surface layer can be attached to the core in the same way. This is then of course placed on the other side of the core.

FIG. 5 shows parts of a wall panel 70 obtained by the process described in connection with FIG. 4. The wall panel 70 comprises a core 2 and a primary surface layer 10. The primary surface layer 10 consists of two layers. The uppermost layer is a decorative thermoplastic resin impregnated paper 12. A non-decorative base paper 14 is placed under this, closest to the core 2. The rear side of the wall panel 70 is provided with a low lath-work 75. The wall panel has a mainly rectangular shape as seen from the front. A short side edge 71 and long side edge 72 (not shown) is provided with a grove 73. The remaining sides is provided with a tenon 74. The groves 73, the tenons 74 and the lath-work 75 are manufactured pendant to the pressing.

FIG. 6 shows parts of a laminate floor board 60 obtained by the process described in connection with FIG. 3. The laminate floor board 60 comprises a core 2, a primary surface layer 10 and a secondary surface layer 20. The primary surface layer 10 consists of three layers of thermosetting resin impregnated paper. A decorative paper 12 is placed closest to the core 2. Two layers of overlay paper 11 are placed on top of this. The secondary surface layer 20 consists of a conventional so called base paper 21. The laminate floor board 60 has a mainly rectangular shape as seen from the front. A groove 63 has been machined along one short side edge 61 and one long side edge 62. A tenon 64 has been machined along the two remaining sides.

FIGS. 7.1 and 7.2 show different parts of a facade board 80 obtained by the process described in connection with FIG. 1. The facade board 80 comprises a core 2, a primary surface layer 10 and a secondary surface layer 20. The primary surface layer 10 consists of four layers. The two uppermost are so called overlay papers 11 of α-cellulose. A decorative thermosetting resin impregnated paper is placed under these. Under all of these, closest to the core 2, is placed a diffusion preventing foil 13. The secondary surface layer 20 consists of a diffusion preventing foil 23. The diffusion preventing foils 13, 23 may for example be made of aluminium. The main part of the rear side of the facade board 80, which is covered by the secondary surface layer 20, is provided with a low lath-work 85. A ductile quality of aluminium foil is therefore suitable for the rear side as this will be given the desired shape during the pressing. The, facade board 80 has a mainly rectangular shape as seen from the front. A first coupling profile 83 (FIG. 7.1) is placed along one short side edge 81. A second coupling profile 82 is placed along the other long side edge 84. The two coupling profiles 83 and 84, respectively, will interact. An outer notch 87 is placed along the first short side edge 86 while an inner notch 89 is placed along the other short side edge 88. The outer notch 87 is intended to be oriented downwards. Both the coupling profiles 83 and 84, respectively, as well as the notches 87 and 89, respectively and the lath-work 85 are manufactured during the pressing process.

EXAMPLE 1

A decorative mainly isometric thermosetting laminate 1 comprising an isometric core 2 and a primary surface layer 10 was manufactured. The structure of the laminate corresponds to the one shown in FIG. 5. The laminate was manufactured as described in connection with FIG. 1.

A mixture of 84 parts by weight of wood powder with an average particle size of 400 μm and 1 part by weight of lime powder with an average particle size in the range 10 μm was dry mixed with 21 parts by weight of powderous melamine-formaldehyde resin in an extruder 100. The mixing was carried out under powerful kneading so that friction heat was formed. The extruder 100 was cooled so that the temperature in the particle/resin mixture didn't exceed 100° C. The thermosetting resin was thereby bonded to the lime powder and impregnated and bonded to the wood powder. The particles bonded together by the thermosetting resin were parted in a mill 101 whereby an agglomerate of particles and resin was formed. The agglomerate had a particle size of 200 μm and a resin content of 20% by weight. The particle/resin mixture was then dried in dryer 102 to a water content of 4% by weight. The dried particle/resin mixture was then evenly distributed over the primary surface layer 10 which had been placed on a press plate 51. The primary surface layer 10 consisted of a decor paper 12, in the form of a sheet, placed closest to the press plate 51 with the decorative side facing downwards, and a base paper 14 in the form of a sheet placed on top. The base paper 14 will in the finished laminate be placed between the decorative paper 12 and the particle/resin mixture. The base paper 14 was made of Kraft paper, with a surface weight of 150 g/m$^2$, which was impregnated with a solution containing phenol-formaldehyde resin to a dry resin content of 30% by weight. The base paper 14 was then dried whereby the resin cured partly to a so-called B-stage. The decorative paper 12 which was made of α-cellulose with a surface weight of 80 g/m$^2$ was impregnated with melamine-formaldehyde resin to a dry resin content of 50% by weight. The decorative paper 12 was then dried whereby the resin cured partly to a so-called B-stage. A number of such press plates 51 with particle/resin mixture and paper sheets were then placed on top of each other in a discontinuous laminate press 50 in the form of a multiple opening press where the particle/resin mixture was compressed under heat and pressure so that the resin cured, whereby a thermosetting laminate 1 with an isometric core 2 and a primary surface layer 10 was formed. The temperature in the laminate press 50 was during the pressing process 150° C. while the pressure was gradually increased during the first 20 seconds to a final pressure of 200 bar which lasted for 3 minutes. The particle/resin mixture was during the pressing compressed to around a third of its original thickness. The thickness of the finished laminate was measured to 5.2 mm over the top of the lath-work. The height of the lath-work was measured to 1.5 mm.

The following characteristics were obtained in the finished laminate:

| | |
|---|---|
| Abrasion resistance: | >350 turns. |
| Flexural strength: | 100 N/mm$^2$. |
| Coefficient of elasticity: | 10 kN/mm$^2$. |
| Impact resistance: | 10 kJ/m$^2$. |
| Water absorption after a 100 h in water at 23° C.: | 2%. |

An abrasion resistance of 300 turns is fully satisfying since a high abrasion resistance isn't necessary in wall panels, Wall panels are most often assembled as self supporting units why the relatively high flexural strength of 100N/m$^2$ is, desirable as a high flexural strength will give a more solid impression on an assembled panel wall. The impact resistance of 10 kJ/m$^2$ will decrease the risk of cracks in the laminate. Such cracks will foremost be caused by handling during the assembly of the laminate. The type of wall panels 70 manufactured according to the example is often used in wet rooms. It is therefore important that the moisture absorption not is too high as this will cause expansion of the laminate. The direction of the fibres in conventional wall panels made of impregnated paper sheets only, are almost always, of practical reasons, oriented so that the fibres are directed vertically once the wall panels are assembled. This means that the conventional type of wall panel will have its largest moisture related increase in dimension over the longest side as the horizontal side of a wall normally is longer than the vertical side. A water absorption of 2% after 100 h in room temperated water is fully satisfying. A wall panel according to the example was compared in respect of dimension stability, with a conventionally manufactured wall panel with a corresponding design regarding resin content and composition, laminate thickness, as well as pressure and temperature during manufacturing. Both panels were allowed to absorb water until the panel according to the example received an expansion of 0.1% along the fibres of the decorative sheet. The water absorption was then discontinued for both laminates. The expansion was then measured on both panels. The expansion was 0.12% across the fibre in the decorative sheet for the panel according to the example at a longitudinal expansion of 0.1%. The corresponding value for the conventionally manufactured laminate gave an expansion of 0.3% across and 0.07% along the fibre direction. This will of course cause problems as one will have to consider such an expansion when the panels are assembled. The largest expansion will also be found along the longest side of the wall on a traditional panel wall. The expansion of a conventionally manufactured panel wall with a width of 5 m would then be around 15 mm while the corresponding measurement for a wall panel according to the invention would be around 5 mm. The water absorption could of course be decreased further by using diffusion barriers. This would however make the product more expensive. It is consequently possible to obtain a wall panel laminate with better characteristics than a conventional laminate, and at the same time lower the manufacturing costs.

EXAMPLE 2

A decorative mainly isometric thermosetting laminate 1 comprising an isometric core 2 and a primary surface layer 10 and a secondary surface layer 20 was manufactured. The structure of the laminate correspondes to the one shown in FIG. 6. The laminate was manufactured as described in connection with FIG. 2.

A mixture of 51 parts by weight of wood powder with an average particle size of 200 μm and 34 part by weight of corn flour with an average particle size in the range 10 μm was dry mixed with a mixture of 18 parts by weight of urea-formaldehyde resin and 12 parts by weight of phenol-formaldehyde resin in an extruder 100. The mixing was carried out under powerful kneading so that friction heat was formed. The extruder 100 was cooled so that the temperature in the particle/resin mixture didn't exceed 100° C. The thermosetting resin was thereby bonded to the corn flour and impregnated and bonded to the wood powder. The particles bonded together by the thermosetting resin were parted in a mill 101 whereby an agglomerate of particles and resin was formed. The agglomerate had a particle size of 200 μm and a resin content of 29% by weight. The particle/resin mixture was then dried in dryer 102 to a water content of 4.2% by weight. The dried particle/resin mixture was then evenly distributed over a base paper 21 in the form of a web. The base paper web 21 formed the secondary surface layer 20. The base paper 21 was made of Kraft paper, with a surface weight of 150 g/m$^2$, which was impregnated with a solution containing phenol-formaldehyde resin to a dry resin content of 30% by weight. The base paper web was then dried whereby the resin cured partly to a so-called B-stage. The base paper web 21, with the layer of particle/resin mixture on top of the base paper was then fed between two steel belts 41 of a continuous laminate press 40 with a primary surface layer 10 placed on top of the particle/resin mixture. The primary surface layer 10 consisted of two so-called overlay paper 11 in the form of webs. The overlay paper webs 11 were made of α-cellulose with a surface weight of 30 g/m$^2$ and were impregnated with a solution of melamine-formaldehyde resin to a dry resin content of 60% by weight. The uppermost of the overlay paper web 11 was sprinkled with 2 g/m$^2$ of hard particles in the form of aluminium oxide with an average particle size of 20 μm before the resin was dry. The lower overlay paper web 11 was sprinkled with 8 g/m$^2$ of hard particles in the form of aluminium oxide with an average particle size of 100 μm before the resin was dry. The overlay paper webs 11 were then dried whereby the resin cured partly to a so-called B-stage. Below the overlay paper webs 11, that is closest to the particle/resin mixture, was a decorative paper 12 in the form of a web fed. The decorative paper web 12 which was made of α-cellulose with a surface weight of 80 g/m$^2$ was impregnated with melamine-formaldehyde resin to a dry resin content of 50% by weight. The decorative paper web was then dried whereby the resin cured partly to a so-called B-stage. The particle/resin mixture and the paper webs were then compressed under heat and pressure so that the resin cured whereby a thermosetting laminate 1 with an isometric core 2, a decorative and abrasion resistant primary surface layer 10 and a non-decorative secondary surface layer was formed. The temperature in the laminate press 40 was during the pressing 155° C. while the pressure gradually was raised during the first 5 seconds to a final pressure of 70 bar which lasted for 1 minute. The particle/resin mixture was during the pressing compressed to about a third of its original thickness. The thickness of the finished laminate was measured to 6 mm.

The following characteristics were obtained in the finished laminate:

| | |
|---|---|
| Abrasion resistance: | >7200 turns. |
| Flexural strength: | 80 N/mm$^2$. |
| Coefficient of elasticity: | 8 kN/mm$^2$. |
| Impact resistance: | 3 kJ/m$^2$. |
| Water absorption after a 100 h in water at 23° C.: | 5.2%. |

Since a high abrasion resistance is necessary on laminate floors an abrasion resistance of >7000 turns is desired. A low flexural strength should be avoided since differences in expansion between the core and the surface layer otherwise may cause warping. A flexural strength of 80 N/m$^2$ has been found to be sufficient. An impact resistance of 8 kJ/m$^2$ and a coefficient of elasticity of 8 kN/m$^2$ will decrease the risk of cracks in the laminate. Such cracks will foremost be caused by dropping hard and heavy objects, as for example a flat-iron. A core of particle board is most often used in conventional types of laminate floors since a compact laminate made of impregnated paper would be too costly to manufacture. The conventional type of laminate floor most often has an impact resistance in the range 3–5 kJ/m$^2$. Laminate floors according to the present invention are accordingly considerably better. The type of laminate floor manufactured according to the example is seldom exposed to moisture. The moisture absorption is therefore allowed to be higher. A laminate floor manufactured according to the example will have an expansion of less than 30% of the expansion for a conventionally manufactured laminate floor at the same level of moisture exposure. This will make it possible to cover larger floor areas than before, without the need of dilatation devices. The water absorption can of course be lowered by using diffusion barriers whereby a laminate floor could be used in a wet room as well. Such a floor would, however, be more costly to manufacture. It is consequently possible to obtain a laminate floor with better characteristics than a conventional laminate floor, and at the same time lower the manufacturing costs.

EXAMPLE 3

A decorative mainly isometric thermosetting laminate 1 comprising an isometric core 2 and a primary surface layer 10 and a secondary surface layer 20 was manufactured. The structure of the laminate correspondes to the one shown in FIGS. 7.1 and 7.2. The laminate was manufactured as described in connection with FIG. 1.

A mixture of 40 parts by weight of wood powder with an average particle size of 400 μm, 10 part by weight of waste material from laminate manufacturing in the form of 60% cellulose with 40% cured melamine-formaldehyde resin with an average particle size of 400 μm, 10 parts by weight of rubber particles with an average particle size of 100 μm and 24 parts by weight of stone powder with an average particle size in the range 30 μm, was dry mixed with a mixture of 37 parts by weight of melamine-formaldehyde resin in an extruder 100. The mixing was carried out under powerful kneading so that friction heat was formed. The extruder 100 was cooled so that the temperature in the particle/resin mixture didn't exceed 100° C. The thermosetting resin was hereby bonded to the stone flour the rubber particles and the waste material and impregnated and bonded to the wood powder. The particles bonded together by the thermosetting resin were parted in a mill 101 whereby an agglomerate of particles and resin was formed. The agglomerate had a particle size of 200 μm and a resin content of 33% by weigh of which three, percent consisted of already cured resin. The particle/resin mixture was then dried in dryer 102 to a water content of 4% by weight. The dried particle/resin mixture was then evenly distributed over the primary surface layer 10 which was placed on a press plate 51. The primary surface layer consisted of a decorative paper 12 in the form of a sheet placed closest to the press plate with the decorative side facing downwards and a diffusion barrier 13 in the form of an aluminium foil sheet. The diffusion barrier was placed closest to the particle/resin mixture in the finished laminate. The decorative paper 12 which was made of α-cellulose with a surface weight of 80 g/m$^2$ was impregnated with melamine-formaldehyde resin to a dry resin content of 50% by weight. The decorative paper 12 was then dried whereby the resin cured partly to a so-called B-stage. The diffusion barrier 13 comprised a 40 μm thick aluminium foil which was brush-plated on both sides for increased adhesion. A secondary surface layer 20 in the form of a diffusion barrier 23, was placed on top of the particle/resin mixture: This comprised a 40 μm thick aluminium foil of a ductile quality and was brush-plated on one side for increased adhesion. A number of such press plates 51 with particle/resin mixture and paper sheets were then placed on top of each other in a discontinuous laminate press 50 in the form of a multiple opening press wherein the particle/resin mixture was compressed under heat and pressure so that the resin cured, whereby a thermosetting laminate 1 with an isometric core 2 and a primary surface layer was formed. The temperature in the laminate press 50 was during the pressing procedure 150° C. while the pressure was gradually increased during the first 20 seconds to a final pressure of 200 bar which lasted for 3 minutes. The particle/resin mixture was, during the pressing, compressed to about a third of its original thickness. The thickness of the finished laminate was measured to 5.2 mm over the top of the lath-work. The height of the lath-work was measured to 1.5 mm.

The following characteristics were obtained in the finished laminate:

| | |
|---|---|
| Abrasion resistance: | >300 turns. |
| Flexural strength: | 160 N/mm². |
| Coefficient of elasticity: | 18 kN/mm². |
| Impact resistance: | 25 kJ/m². |
| Water absorption after a 100 h in water at 23° C.: | 0.5%. |

An abrasion resistance of 300 turns is fully satisfying since a high abrasion resistance isn't necessary in facade boards. Facade boards are most often assembled as self supporting units, why the high flexural strength of 160N/m² is desirable as a high flexural strength will give a more solid impression on an assembled facade board, while the risk that the boards will come off, during for example a storm, at the same time is reduced. The impact resistance of 18 kJ/m² will decrease the risk of cracks in the laminate. Such cracks may, besides the handling when the laminate is assembled, also be caused by unforeseen blows from, for example, a perpetrator. The type of facade boards 80 manufactured according to the example will be exposed to many different climatic types as they are placed outdoors. It is therefore important that the moisture absorption isn't too high, since moisture absorption will cause expansion, or in other words changes in the dimensions in the laminate. A water absorption of 0.5% after 100 h in room tempered water is fully sufficient. The direction of the fibres in conventional facade boards made of impregnated paper sheets only, is almost always, of practical reasons, oriented vertically which means that such facade boards will have its largest moisture related increase in dimension along the longest side of a normal facade. This means that the conventional type of wall panel will have its largest moisture related increase in dimension over the longest side as the horizontal side of a wall normally is longer than the vertical side.

A facade board according to the example was compared in respect of dimension stability, with a conventionally manufactured wall panel with a corresponding design regarding resin content and composition, laminate thickness, as well as pressure and temperature during manufacturing. The two boards were allowed to absorb water until the board according to the example received an expansion of 0.05% along the fibre of the decorative sheet. The water absorption was then discontinued for both laminates. The expansion was then measured on both boards. The expansion was 0.05% across the fibres in the decorative sheet for the board according to the example at a longitudinal expansion of 0.05%. The corresponding value for the conventionally manufactured laminate gave an expansion of 0.15% across and 0.04% along the fibre direction. The expansion for a conventional facade boarding with a length of 15 m would then be close to 25 mm while the corresponding measurement for a facade boarding according to the example would be around 7 mm. It is consequently possible to obtain a facade board laminate with better characteristics than a conventional such laminate, and at the same time lower the manufacturing costs.

EXAMPLE 4

A decorative mainly isometric thermosetting laminate 1 comprising an isometric core 2 and a primary surface layer 10 was manufactured. The structure of the laminate corresponds to the one shown in FIG. 5. The laminate was manufactured as described in connection with FIG. 4.

A mixture of 84 parts by weight of wood powder with an average particle size of 400 μm and 1 part by weight of lime powder with an average particle size in the range of 10 μm was dry mixed with 21 parts by weight of powderous melamine-formaldehyde resin in an extruder 100. The mixing was carried out under powerful kneading so that friction heat was formed. The extruder 100 was cooled so that the temperature in the particle/resin mixture didn't exceed 85° C. The thermosetting resin was thereby bonded to the lime powder and impregnated and bonded to the wood powder. The particles bonded together by the thermosetting resin were parted in a mill 101 whereby an agglomerate of particles and resin was formed. The agglomerate had a particle size of 200 μm and a resin content of 20% by weight. The particle/resin mixture was then dried in a dryer 102 to a water content of 4% by weight. The dried particle/resin mixture was then evenly distributed on a press plate 51. A number of such press plates 51 with particle/resin mixture were then placed on top of each other in a discontinuous laminate press 50 in the form of a multiple opening press wherein the particle/resin mixture was compressed under heat and pressure so that the resin flowed without curing, whereby a pre-fabricate to an isometric core 2 was formed. The temperature in the laminate press 50 was during the pressing process 100° C. while the pressure was gradually increased during the first 20 seconds to a final pressure of 200 bar which lasted for 3 minutes. The particle/resin mixture was during the pressing compressed to around a third of its original thickness. The laminate press 50 was then opened whereby the press plates 51 containing the pre-fabricated cores 2 could be removed. The pre-fabricated cores 2 were then cooled. A pre-fabricated core was then placed on the primary surface layer 10 which had been placed on a press plate 51. The primary surface layer 10 consists of a decor paper 12, in the form of a sheet, placed closest to the press plate 51 with the decorative side facing downwards, and a base paper 14 in the form of a sheet placed on top. The base paper 14 will in the finished laminate be placed between the decorative paper 12 and the core 2. The base paper 14 was made of Kraft paper, with a surface weight of 150 g/m², which was impregnated with a solution containing phenol-formaldehyde resin to a dry resin content of 30% by weight. The base paper 14 was then dried whereby the resin cured partly to a so-called B-stage. The decorative paper 12 which was made of α-cellulose with a surface weight of 80 g/m² was impregnated with melamine-formaldehyde resin to a dry resin content of 50% by weight. The decorative paper 12 was then dried whereby the resin cured partly to a so-called B-stage. A number of such press plates 51 with pre-fabricated cores 2 and primary surface layers 10 were then placed on top of each other in a discontinuous laminate press 50 in the form of a multiple opening press wherein the cores 2 and the surface layers were pressed together under heat and pressure so that the resin cured, whereby a decorative laminate 1 with an isometric core 2 was formed. The temperature in the laminate press 50 was during pressing process 150° C. while the pressure was gradually increased during the first 20 seconds to a final pressure of 80 bar which lasted for 3 minutes. The thickness of the finished laminate was measured to 5.2 mm over the top of the lath-work. The height of the lath-work was measured to 1.5 mm.

The following characteristics were obtained in the finished laminate:

| | |
|---|---|
| Abrasion resistance: | >350 turns. |
| Flexural strength: | 120 N/mm². |
| Coefficient of elasticity: | 12 kN/mm². |
| Impact resistance: | 11 kJ/m². |
| Water absorption after a 100 h in water at 23° C.: | 1%. |

An abrasion resistance of 300 turns is fully satisfying since a high abrasion resistance isn't necessary in wall panels. Wall panels are most often assembled as self supporting units why the relatively high flexural strength of 120N/m² is desirable as a high flexural strength will give a more solid impression on an assembled panel wall. The impact resistance of 11 kJ/m² will decrease the risk of cracks in the laminate. Such cracks will foremost be caused by handling during the assembly of the laminate. The type of wall panels 70 manufactured according to the example is often used in wet rooms. It is therefore important that the moisture absorption not is too high as this will cause expansion of the laminate. The direction of the fibres in conventional wall panels made of impregnated paper sheets only, is almost always, of practical reasons, oriented so that the fibres are directed vertically once the wall panels are assembled. This means that the conventional type of wall panel will have its largest moisture related increase in dimension over the longest side as the horizontal side of a wall normally is longer than the vertical side. A water absorption of 1% after 100 h in room temperated water is fully satisfying.

A wall panel according to the example was compared in respect of dimension stability, with a conventionally manufactured wall panel with a corresponding design regarding resin content and composition, laminate thickness, as well as pressure and temperature during manufacturing. Both panels were allowed to absorb water until the panel according to the example obtained an expansion of 0.1% along the fibres of the decorative sheet. The water absorption was then discontinued for both laminates. The expansion was then measured on both panels. The expansion was 0.12% across the fibre in the decorative sheet for the panel according to the example at a longitudinal expansion of 0.1%. The corresponding value for the conventionally manufactured laminate gave an expansion of 0.5% across and 0.12% along the fibre direction. This will of course cause problems as one will have to consider such an expansion when the panels are assembled. The largest expansion will also be found along the longest side of the wall on a conventional panel wall. The expansion for a conventionally manufactured panel wall with a width of 5 m would then be around 25 mm while the corresponding measurement for a wall panel according to the invention would be around 5 mm. The water absorption could of course be decreased further by using diffusion barriers. This would however make the product more expensive. It is consequently possible to obtain a wall panel laminate with better characteristics than a traditional laminate, and at the same time lower the manufacturing costs.

EXAMPLE 5

A decorative mainly isometric thermosetting laminate 1 comprising an isometric core 2 and a primary surface layer 10 and a secondary surface layer 20 was manufactured. The structure of the laminate corresponds to the one shown in FIG. 6. The laminate was manufactured as described in connection with FIG. 3.

A mixture of 51 parts by weight of wood powder with an average particle size of 200 $\mu$m and 34 part by weight of corn flour with an average particle size in the range of 10 $\mu$m was dry mixed with a mixture of 6 parts by weight of urea-formaldehyde resin and 24 parts by weight of phenol-formaldehyde resin in an extruder 100. The mixing was carried out under powerful kneading so that friction heat was formed. The extruder 100 was cooled so that the temperature in the particle/resin mixture didn't exceed 85° C. The thermosetting resin was hereby bonded to the corn flour and impregnated and bonded to the wood powder. The particles bonded together by the thermosetting resin were parted in a mill 101 whereby an agglomerate of particles and resin was formed. The agglomerate had a particle size of 200 $\mu$m and a resin content of 29% by weight. The particle/resin mixture was then dried in dryer to a water content of 4.2% by weight. The dried particle/resin mixture was then evenly distributed over a base paper 21 in the form of a web. The base paper web 21 formed the secondary surface layer 20. The base paper 21 was made of Kraft paper, with a surface weight of 150 g/m², which was impregnated with a solution containing phenol-formaldehyde resin to a dry resin content of 30% by weight. The base paper web was then dried whereby the resin cured partly to a so-called B-stage. The base paper web 21, with the layer of particle/resin mixture on top of was then fed between two steel belts 41' in a first continuous laminate press 40'. The particle/resin mixture and the paper web were then compressed under heat and pressure so that the resin flowed without curing whereby a pre-fabricate to an isometric core 2 with a non-decorative secondary surface layer 20 was formed. The temperature in the laminate press 40' was during the pressing 90° C. while the pressure gradually was raised during the first 5 seconds to a final pressure of 70 bar which lasted for 30 seconds. The particle/resin mixture was during the pressing compressed to about a third of its original thickness. The pre-fabricated core 2 with the attached secondary surface layer 20 was after having passed through the first laminate press 40' fed between two press belts 41" of a second laminate press 40" together with a primary surface layer 10 on top. The primary surface layer 10 consisted, from the top, of two so-called overlay paper 11 in the form of webs. The overlay paper webs 11 were made of $\alpha$-cellulose with a surface weight of 30 g/m² which were impregnated with a solution of melamine-formaldehyde resin to a dry resin content of 60% by weight. The uppermost of the overlay paper web 11 was sprinkled with 2 g/m² of hard particles in the form of aluminium oxide with an average particle size of 20 $\mu$m before the resin was dry. The lower overlay paper web 11 was sprinkled with 8 g/m² of hard particles in the form of aluminium oxide with an average particle size of 100 $\mu$m before the resin was dry. The overlay paper webs 11 were then dried whereby the resin cured partly to a so-called B-stage. Below the overlay paper webs 11, that is closest to the particle/resin mixture, was a decorative paper 12 in the form of a web fed. The decorative paper web 12, which was made of $\alpha$-cellulose with a surface weight of 80 g/m², was impregnated with melamine-formaldehyde resin to a dry resin content of 50% by weight. The decorative paper web was then dried whereby the resin cured partly to a so-called B-stage. The pre-fabricated core 2 with the attached secondary surface layer 20 and the paper webs were then pressed together under heat and pressure so that the resin cured whereby a thermosetting laminate 1 with an isometric core 2, a decorative and abrasion resistant primary surface layer 10 and a non-decorative secondary surface layer 20 was formed. The temperature in the laminate press 40 was during the pressing 155° C. while the pressure was 70 bar which lasted for 1 minute. The thickness of the finished laminate was measured to 6 mm.

The following characteristics were obtained in the finished laminate:

| | |
|---|---|
| Abrasion resistance: | >7200 turns. |
| Flexural strength: | 81 N/mm². |
| Coefficient of elasticity | 7 kN/mm². |
| Impact resistance: | 9 kJ/m². |
| Water absorption after a 100 h in water at 23° C.: | 3.8%. |

Since a high abrasion resistance is necessary on laminate floors an abrasion resistance of >7000 turns is desired. A low flexural strength should be avoided since differences in expansion between the core and the surface layer otherwise may cause warping. A flexural strength of 81N/m² has been found to be sufficient. The impact resistance of 9 kJ/m² and a coefficient of elasticity of 7 kN/m² will decrease the risk of cracks in the laminate. Such cracks will foremost be caused by dropping hard and heavy objects, as for example a flat-iron. A core of particle board is most often used in conventional types of laminate floors since a compact laminate made of impregnated paper would be to costly to manufacture. The conventional type of laminate floor most often has an impact resistance in the range of 3–5 kJ/m². Laminate floors according to the present invention are accordingly considerably better. The type of laminate floor manufactured according to the example is seldom exposed to moisture. The moisture absorption is therefore allowed to be higher. A laminate floor manufactured according to the example will have an expansion of less than 25% of the expansion of a conventionally manufactured laminate floor at the same level of moisture exposure. This will make it possible to cover larger floor areas than before, without need of dilatation devices. The water absorption can of course be lowered by using diffusion barriers whereby a laminate floor could be used in a wet room as well. Such a floor would however be more costly to manufacture. It is consequently possible to obtain a laminate floor with better characteristics than a conventional laminate floor, and at the same time lower the manufacturing costs.

FIG. 8 shows the presence of carrier 30 upon which the dried particle/resin mix is distributed.

The invention is not limited to the embodiments shown since these can be varied in different ways within the scope of the invention.

What is claimed is:

1. A process for manufacturing a decorative substantially isometric thermosetting laminate (1) comprising an isometric core (2), a primary surface layer (10) and optionally a secondary surface layer (20), comprising
   i) A. mixing 85 parts by weight of particles, which particles have an average particle size of 5–3000 μm with 15–85 parts by weight of a thermosetting resin in the form of a powder, wherein the resin is selected from the group consisting of a phenol-formaldehyde resin, a melamine formaldehyde resin, a urea-formaldehyde resin and a mixture thereof, wherein the mixing takes place in an extruder;
   B. kneading the mixture energetically so that friction heat is formed, which friction heat is not allowed to exceed 150° C.; and
   C. bonding the soft thermosetting resin to or impregnating the particles,
   D. those particles that possibly are joined by the thermosetting resin are divided and an agglomerate of thermoplastic resin and particles is formed which agglomerate has an average particle size of 200–3000 μm and a resin content of 10–50% by weight;
   ii) drying the particle/resin mixture to a water content below 10% by weight;
   iii a) distributing the dried particle/resin mixture evenly on one member selected from the group consisting of a carrier (30); a pressing belt (41) of a continuous laminate press (40); and a press plate (51) of a discontinuous laminate press (50), and is thereafter continuously or discontinuously compressed at a temperature of 60–120° C., and a pressure of 15–400 bars so that the particle/resin agglomerate flows out without completely curing the resin whereby a pre-fabricated isometric core (2) is obtained, that the pre-fabricated core is fed in between one member selected from the group consisting of the press belts (41) of a continuous laminate press (40) and a press plate (51) of a discontinuous laminate press (50) together with a primary surface layer (10), which is provided with a decorative layer, and optionally a secondary layer (20) and is thereafter continuously or discontinuously compressed at a temperature of 120–200° C., and a pressure of 15–300 bar, so that the resin cures, whereby a decorative thermosetting laminate provided with an isometric core is obtained, or
   b) drying the dried particle resin/mixture evenly on one member selected from the group consisting of a carrier (30), a pressing belt (41) of a continuous laminate press (40) and on a press plate (51) of a discontinuous laminate press (50) and is thereafter continuously or discontinuously compressed at a temperature of 120–200° C., and a pressure of 15–300 bar, so that the resin cures, whereby an isometric core (2) is formed, and that the core (2) is provided with a primary surface layer (10) and optionally a secondary surface layer (20) simultaneously with or after the pressing.

2. A process according to claim 1 wherein the particles completely or partly consist of wood parts or fruit parts from plants.

3. A process according to claim 1 wherein the particles completely or partly consist of recycled material.

4. A process according to claim 1 wherein the particles completely or partly consist of lime.

5. A process according to claim 1 wherein the particles are dried to a water content below 10% by weight, before the mixing.

6. A process according to claim 1 wherein the dried particle/resin mixture is distributed such that the particle weight per unit area in any one part of the core does not exceed the particle weight per unit area in any other area by more than 10%.

7. A process according to claim 1 wherein the carrier (30) is formed by the primary surface layer (10) or the secondary surface layer (20).

8. A process according to claim 1 wherein the pressing process is initiated at a low initial pressure of the final pressure during which initial pressure the particle/resin mixture is allowed to flow as the resin softens due to the temperature.

9. A process according to claim 1 wherein the primary surface layer (10) consists of at least one or more decorative papers (12) one or more underlying base paper (14), impregnated with a thermosetting resin and one or more so-called overlay paper (11) placed on top and impregnated with melamine-formaldehyde resin or urea-formaldehyde resin, and optionally a diffusion preventing foil (13) placed closest to the core (2).

10. A process according to claim 9 wherein the diffusion preventing foil (13) consists of a metal or of a plastic material.

11. A process according to claim 1 wherein the secondary surface layer (20) consists of at least one or more base paper (21) impregnated with thermosetting resin.

12. A process according to claim 1 wherein the secondary surface layer (20) consists of at least one or more decorative paper (22) impregnated with thermosetting resin.

13. A process according to claim 1 wherein the secondary surface layer (20) consists of at least one diffusion preventing foil (23) placed closest to the core (2).

14. A process according to claim 13 wherein the diffusion preventing foil (23) consists of a metal or of a plastic material.

15. A process according to claim 10 comprising treating the surfaces of the diffusion preventing foil such that the adhesion to the laminate (1) is increased by surface enlargement or surface activation.

16. A process according to claim 10 wherein the diffusion preventing foil has a thickness of 5–2000 μm.

17. A process according to claim 16 wherein the diffusion preventing foil consists of a metal having a thickness of 5–200 μm.

18. A process according to claim 16 wherein the diffusion preventing foil (13 and 23) consists of a thermoplastic material having a thickness of 0.2–2 mm.

19. A process according to claim 10 wherein the diffusion preventing foil (13 and 23) has a thermal coefficient of expansion in the range of $15 \times 10^{-6}$/K and $100 \times 10^{-6}$/K.

20. A process according to claim 1 wherein the thermosetting laminate (1) is provided with three-dimensional functional parts.

21. A process according to claim 15 comprising treating the surfaces of the diffusion preventing foil by at least one coating selected from the group consisting a primer, micro-etched, blasted, corona treated, spark milled, brush plated, and electro-plated.

22. A process according to claim 1, wherein the particles in the mixing step are organic particles.

23. A process according to claim 1, wherein the particles in the mixing step have an average particle size of 5–200 μm.

24. A process according to claim 1, wherein the thermosetting particles form 22–37 parts by weight.

25. A process according to claim 1, wherein the friction heat in the kneading step is maintained below 110° C.

26. A process according to claim 25, wherein the friction heat in the kneading step is maintained below 90° C.

27. A process according to claim 1, wherein the agglomerate in the bonding step has a resin content of 20–30% by weight.

28. A process according to claim 1, wherein the first compressing in the distributing step (iii a) is at a temperature of 80–100° C.

29. A process according to claim 1, wherein the first compressing in the distributing step (iii a) is at a pressure of 30–120 bar.

30. A process according to claim 1, wherein the second compressing in the distributing step (iii a) is at a temperature of 140–180° C.

31. A process according to claim 1, wherein the second compressing in the distributing step (iii a) is at a pressure of 30–150 bar.

32. A process according to claim 1, wherein the compressing in the drying step (iii b) is at a temperature of 140–180° C.

33. A process according to claim 1, wherein the compressing in the drying step (iii b) is at a pressure of 30–150 bar.

34. A process according to claim 3, wherein the recycled material is waste paper, cardboard or rejects from thermosetting laminate manufacturing.

35. A process according to claim 5, wherein the particles are dried to a water content below 6% by weight.

36. A process according to claim 8, wherein the initial pressure is 10–50% of the final pressure.

37. A process according to claim 10, wherein the metal is selected from the group consisting of aluminium, steel, copper and zinc.

38. A process according to claim 10, wherein the plastic material is at least one selected from the group consisting of polyethylene, polypropylene, polyalkylene terephthalate, acrylic polymer, polyvinyl chloride and fluorinated thermoplastic.

39. A process according to claim 11, wherein the thermosetting resin is at least one selected from the group consisting of melamine-formaldehyde resin and urea-formaldehyde resin.

40. A process according to claim 12, wherein the thermosetting resin is at least one selected from the group consisting of melamine-formaldehyde resin and urea-formaldehyde resin.

41. A process according to claim 14, wherein the metal is selected from the group consisting of as aluminium, steel, copper and zinc.

42. A process according to claim 14, wherein the plastic material is selected from the group consisting of polyethylene, polypropylene, polyalkylene-terephthalate, acryl, polyvinyl chloride and fluorinated thermoplastic.

43. A process according to claim 16, wherein the foil has a thickness of 10–1000 μm.

44. A process according to claim 17, wherein the foil consists of a metal having a thickness of 10–100 μm.

45. A process according to claim 18, wherein the foil consists of a thermoplastic material having a thickness of 0.3–1 mm.

46. A process according to claim 19 wherein the diffusion preventing foil has a thermal coefficient of expansion in the range of $15 \times 10^{-6}$/K and $50 \times 10^{-6}$/K.

47. A process according to claim 20, wherein the three-dimensional functional parts are at least one selected from the group consisting of a tenon, groove and a lattice structure.

48. A process according to claim 6 wherein the dried particle/resin mixture is distributed such that the particle weight per unit area in any one part of the core does not exceed the particle weight per unit area in any other area by more than 3%.

49. A process according to claim 1, wherein the particle/resin mixture is dried to a water content of less than 5% by weight.

50. A process according to claim 2, wherein the wood parts comprise at least one selected from the group consisting of saw dust, wood powder and finely chopped straw.

51. A process according to claim 2, wherein the fruit parts consist of a cereal in the form of a flour.

52. A process according to claim 51, wherein the flour is selected from the group consisting of corn, wheat and rice flour.

53. A process according to claim 9, wherein the at least 1 or more decorative papers comprise α-cellulose.

54. The process according to claim 53, wherein the thermosetting resin impregnated into the α-cellulose is one or more selected from the group consisting of melamine-formaldehyde resin and urea-formaldehyde resin.

55. A process according to claim 12, wherein the at least 1 or more decorative papers comprise α-cellulose.

56. The process according to claim 55, wherein thermosetting resin impregnated into the α-cellulose is one or more selected from the group consisting of melamine-formaldehyde resin and urea-formaldehyde resin.

57. A thermosetting laminate (1) made by the process of claim 1 wherein the thermosetting laminate (1) is mainly isometric with a difference in coefficient of expansion between the length and the cross direction of the laminate of less than 10%.

58. The thermosetting laminate (1) according to claim 57 wherein the thermosetting laminate (1) has a water absorption ability which is lower than 10% by weight after 100 h in water at 23° C.

59. A thermosetting laminate according to claim 58, wherein the water absorption ability is lower than 6% by weight after 100 h in water at 23° C.

60. The thermosetting laminate (1) according to claim 57 wherein the thermosetting laminate (1) has an impact resistance of greater than 2 kJ/m$^2$.

61. A thermosetting laminate according to claim 60, wherein the thermosetting laminate has an impact resistance greater than 3 kJ/m$^2$.

62. The thermosetting laminate (1) according to claim 57 wherein the primary surface layer (10) includes at least one thermosetting resin impregnated paper which is coated with hard particles with an average size of 1–100 μm.

63. A thermosetting laminate according to claim 62, wherein the impregnated paper is the uppermost paper.

64. A thermosetting laminate according to claim 62, wherein the hard particles comprise at least one selected from the group consisting of silicon oxide, aluminium oxide and silicon carbide.

65. A thermosetting laminate according to claim 62, wherein the hard particles have an average particle size of around 5–60 μm.

66. A process of using a thermosetting laminate (1) according to claim 57, comprising providing the thermosetting laminate in a form selected from the group consisting of a covering material on floors, inner walls, ceilings, table tops, work tops, facade boarding, roofs, and doors in dry and wet spaces as well as in wet spaces.

* * * * *